(12) United States Patent
Kagan et al.

(10) Patent No.: US 6,373,786 B1
(45) Date of Patent: Apr. 16, 2002

(54) CAP FOR A HERMETICALLY SEALED CONTAINER

(75) Inventors: Michael Kagan; Ian M. Solomon, both of Jerusalem; Amir Genosar, Pardes-Hanna; Gil Sat, Kibbutz Gadot, all of (IL)

(73) Assignee: Profile Sol-Gel Ltd., Jerusalem (IL)

( * ) Notice: Subject to any disclaimer, the term of this patent is extended or adjusted under 35 U.S.C. 154(b) by 0 days.

(21) Appl. No.: 09/418,591

(22) Filed: Oct. 15, 1999

(51) Int. Cl.$^7$ .............................................. G04B 47/00
(52) U.S. Cl. ...................................................... 368/10
(58) Field of Search ................... 368/10, 327; 116/200, 116/279

(56) References Cited

U.S. PATENT DOCUMENTS

| | | | |
|---|---|---|---|
| 3,960,713 A | 6/1976 | Carey | 206/534 |
| 4,292,916 A | 10/1981 | Bradley et al. | 116/205 |
| 4,367,955 A | 1/1983 | Ballew | 368/10 |
| 4,511,052 A | * 4/1985 | Klein et al. | 116/200 |
| 4,570,825 A | 2/1986 | Stull | 222/45 |
| 4,572,387 A | 2/1986 | Luker et al. | 215/252 |
| 4,920,912 A | 5/1990 | Kirkling | 116/308 |
| 5,009,338 A | 4/1991 | Barker | 215/230 |
| 5,053,339 A | 10/1991 | Patel | 436/2 |
| 5,115,929 A | 5/1992 | Buono | 215/220 |
| 5,229,701 A | 7/1993 | Leman et al. | 320/2 |
| 5,233,571 A | 8/1993 | Wirtschafter | 368/10 |
| 5,261,548 A | 11/1993 | Barker et al. | 215/230 |
| 5,265,744 A | * 11/1993 | Duty et al. | 116/200 |
| 5,313,439 A | 5/1994 | Albeck | 368/10 |
| 5,358,117 A | 10/1994 | Adams | 206/534 |
| 5,446,705 A | 8/1995 | Haas et al. | 368/327 |
| 5,457,665 A | 10/1995 | Reid | 368/93 |
| 5,555,223 A | 9/1996 | Barainsky | 368/10 |
| 5,633,835 A | 5/1997 | Haas et al. | 368/327 |
| 5,720,392 A | 2/1998 | Price | 206/534 |
| 5,829,613 A | 11/1998 | Wohlgemuth et al. | 215/256 |

* cited by examiner

*Primary Examiner*—Bernard Roskoski
(74) *Attorney, Agent, or Firm*—Pillsbury Winthrop LLP

(57) ABSTRACT

The present invention provides a cap for a hermetically sealed container, said cap providing a visually observable indication of elapsed time from the opening of the seal of said container, said cap including means for releasing a chemical which effects a color change in a chamber formed therein, said chamber being provided with a transparent section for viewing the contents thereof and said released chemical effecting a cumulative color change of said section with time, the arrangement being such that manipulation of said cap to open said container and said seal effects activation of said releasing means.

17 Claims, 3 Drawing Sheets

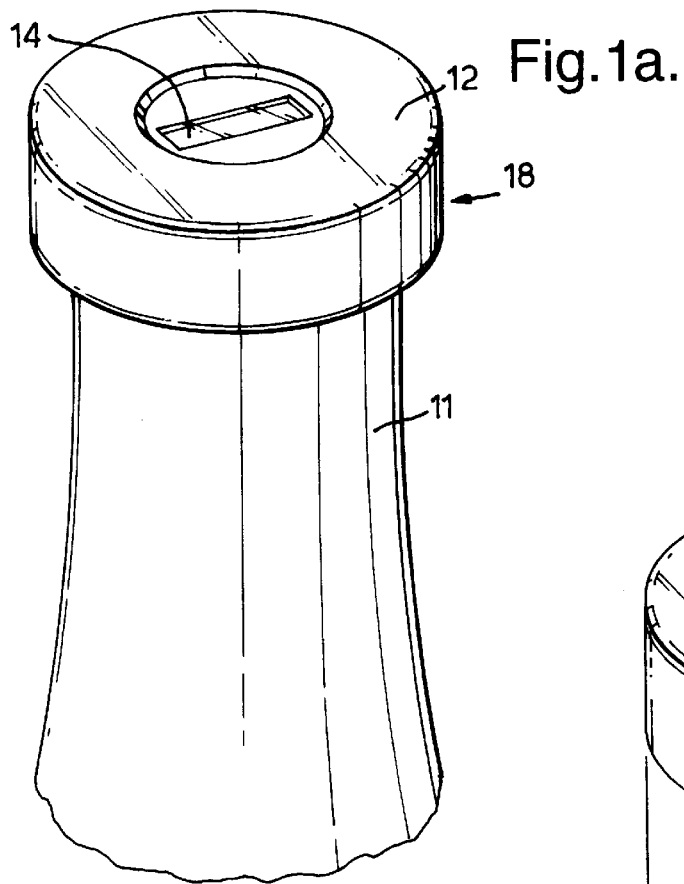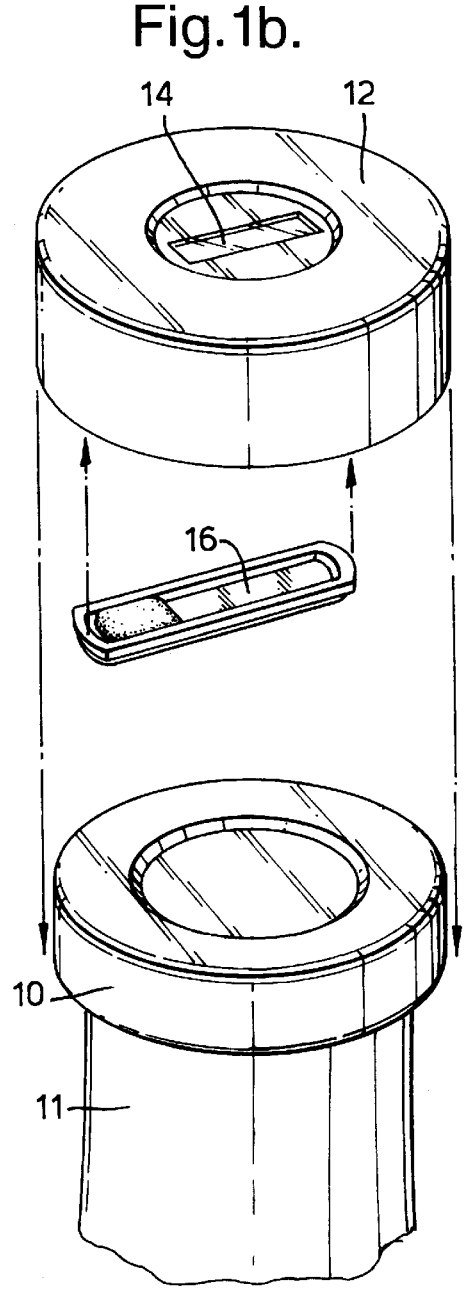

CAP FOR A HERMETICALLY SEALED CONTAINER

The present invention relates to a cap for food, medicine, beverage containers and other perishables More particularly, the invention relates to a screw/lug or lift-up cap for attachment to bottles or other containers where said cap incorporates a lifetime indicator.

Consumer awareness of product freshness has led to the widespread practice of addressing this issue by means of appropriate product labeling. Where relevant, the label will typically provide information related to the freshness and suggested storage method of the product. This information may include a date of manufacture, a "sell by" date, or a "best before" date. A "sell by" date specifies by which date the product should have been sold to the consumer. A "best before" date specifies by when the product should be disposed of by vendor or consumer.

The recommended storage method typically specifies whether the product is to be stored in the refrigerator or freezer and whether this storage method is to be used from the time of purchase or from the time of first opening. The former method is typically used for dairy products, whereas the latter method is usually more appropriate for jams, sauces conserves and liquid medications. For some items the labeling will also specify for how long the product may be kept after it has first been opened. The reasoning behind this is that if the product is produced and packed under sterile conditions, first contamination can only occur following this first opening.

A number of products have been developed and commercialized that implement the concept of active labeling. These products contain a closed chemical system which changes color either as a function of elapsed time since activation, or by integrating time and temperature since activation. The latter are termed TTIs (time-temperature indicators) whereas the former merely indicate the passage of time. The specifications of a TTI can be set to emulate those of the foodstuff in the package. Thus, given that the TTI is placed on the package and activated as the food is produced, the TTI gives an accurate indication of the food freshness which takes into account the vagaries of the distribution chain. In particular, if the product has not been maintained at the appropriate temperature through a part of the distribution chain, the TTI will give the consumer an indication thereof.

U.S. Pat. Nos. 4,292,916, 5,053,339 5,446,705 and 5,633,835 describe color changing devices for monitoring the shelf-life of perishable products. These devices are initiated by physically bringing into contact reactive layers so that the reaction will start, and this action can only conveniently be performed at the time of packaging. This approach is suitable for monitoring the degradation of foodstuffs which lose freshness throughout the entire distribution chain. U.S. Pat. No. 5,555,223 describes a process for attaching timing indicators to packaging, including the step of setting the timer clock at the exact time of production.

However, there is a substantial proportion of food and drug stuffs, and other perishables for which significant degradation starts to occur only when the package is opened. For these perishables the existing timers and TTIs are likely to produce misleading results in that they have no simple and foolproof means of activation at the time of opening the package.

It is therefore the intention of the present invention to obviate the shortcomings of the above-mentioned solutions by providing a simple and appropriate means of activating a lifetime indicator for foodstuffs medicines and other perishables which have long shelf lives but deteriorate after opening. Thus, in the present invention, a key element is the use of an opening method which activates the lifetime indicator.

Numerous examples of intelligent opening mechanisms are known in the art. The simplest are tamper-evident mechanisms whereby a clear indication is provided after first operation that the packaging has been opened. Examples are found in U.S. Pat. Nos. 4,570,825, 4,572,387, 5,115,929 and 5,829,613.

Also known in the art are indicator caps, primarily intended for medicine containers, where the time of taking the dosage is shown on the cap. U.S. Pat. Nos. 3,960,713 and 4,920,912 both use a time dial in the cap that may be swiveled to show the desired time, typically that of the next dosage. U.S. Pat. Nos. 5,009,338, 5,229,701 and 5,261,548, all by Baker, A. et al describe caps with mechanical mechanisms that automatically advance the setting on the time dial to the next position, each time the cap is replaced. U.S. Pat. No. 5,358,117 describes the use of a pointer mounted in the cap to point to the time when the next dosage is to be taken. U.S. Pat. No. 5,720,392 describes a cap with an embedded clock face and with two pointers; one showing when medication was last taken and the other showing when the next dose is due.

Also known in the art are automatic timers built into bottle caps activated by the engagement of the cap relative to the bottle in order to give an alarm at the time the next dosage is to be taken. U.S. Pat. No. 4,367,955 describes a timer cap which is activated by the engagement of the cap with the container. The timing device that it incorporates is described as being either an electronic timing circuit or a mechanical escapement mechanism. In the latter case the turning of the cap on closure of the container winds up the mechanism mainspring. In both cases, both an audible and a visual signal is given at the time that the next dosage is to be taken. Similar electronic timing mechanisms are described in U.S. Pat. Nos. 5,233,571 and 5,313,439. U.S. Pat. No. 5,457,665 describes a mechanical timer in a cap, implemented by means of a sphere which slowly ascends through a tube containing a viscous solution, however said mechanism is gravity and orientation dependent.

SUMMARY OF THE INVENTION

It is therefore the object of the present invention to provide a food or medicine lifetime indication for foodstuffs medicines or other perishable which have long shelf lives but which start to deteriorate significantly after initial opening of the package. It is a further object of the present invention to ensure maximum ease of use and foolproof operation by ensuring that the action of opening the package activates the indicator.

In a preferred embodiment of the present invention, said indicator is integrated into a container or bottle cap such that the first opening of this cap activates the indicator.

In preferred embodiments of the present invention said indicator is either an elapsed time indicator or a temperature-time indicator.

Thus, according to the present invention there is now provided a cap for a hermetically sealed container, said cap providing a visually observable indication of elapsed time from the opening of the seal of said container, said cap including means for releasing a chemical which effects a color change in a chamber formed therein, said chamber being provided with a transparent section for viewing the contents thereof and said released chemical effecting a cumulative color change of said section with time, the arrangement being such that manipulation of said cap to open said container and said seal effects activation of said releasing means.

In a first preferred embodiment of the present invention there is provided a cap for a hermetically sealed container, said cap providing a visually observable indication of elapsed time from the opening of the seal of said container, said cap including means for releasing a chemical which effects a color change which traverses a chamber formed therein, said chamber being provided with a transparent section for viewing the contents thereof and said released chemical effecting a cumulative, progressive, graphic color change of said section with time, the arrangement being such that manipulation of said cap to open said container and said seal effects activation of said releasing means.

In a second type of preferred embodiments of the present invention there is provided a cap for a hermetically sealed container according to claim 1, said cap providing a visually observable indication of elapsed time from the opening of the seal of said container, said cap including means for releasing a chemical which effects a temperature dependent color change in a chamber formed therein, said chamber being provided with a transparent section for viewing the contents thereof and said released chemical effecting a color change of said section with time and temperature, the arrangement being such that manipulation of said cap to open said container and said seal effects activation of said releasing means.

In preferred embodiments of the present invention said cap comprises at least two parts movable relative to each other and having said chamber formed therebetween, at least one of said parts being provided with said transparent section for viewing said chamber.

Preferably one of said parts includes a recess having a fluid-containing capsule and said other part is provided with a protrusion which is brought into alignment with said recess on opening of said container and is adapted to rupture said fluid-containing capsule.

In especially preferred embodiments of the present invention said chamber contains a porous strip for controlled migration of said chemical and said porous strip can preferably be formed of micro-porous material.

As will be realized, the object of the present invention can be carried out in various manners, as also described in the examples hereinafter, by utilizing various color change reactions and/or dyes.

Thus, e.g., said chamber is provided with a strip containing a color-changing indicator in a porous medium and a liquid reagent which slowly diffuses along said medium to cause a color change, said reagent being released as a result of the movement of said two parts of said cap relative to each other.

Alternatively, said chamber is provided with a strip containing a reagent in a porous medium, and said capsule contains a color-changing indicator which slowly diffuses along said medium to cause a color change, said indicator being released as a result of the movement of said two parts of said cap relative to each other.

As indicated, in preferred embodiments of the present invention said chemical effects a reaction involving a color change in combination with a reagent held in said chamber, e.g., wherein said reaction is based on the interaction between a chelating agent and a metal ion solution, or said reaction is based on the interaction between a pH indicator and a base, or said reaction is based on the interaction between a pH indicator and an acid, or said reaction is based on the interaction between a redox indicator and a reducing agent, between an enzyme and a substrate system, or said reaction is based on the interaction between a redox indicator and an oxidizing agent.

In one of the preferred embodiments of the present invention said chemical is a dye and said dye slowly migrates through a porous medium, wherein said medium is at least partially visible through a transparent section in the cap, resulting in a color-change front which progresses along said medium thereby graphically showing the passage of time.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 1a is a perspective external view of a preferred embodiment of the lifetime cap assembled to a bottle, according to the invention; FIG. 1b is an exploded view of FIG. 1a;

DETAILED DESCRIPTION OF PREFERRED EXEMPLARY EMBODIMENTS

Figure 2:
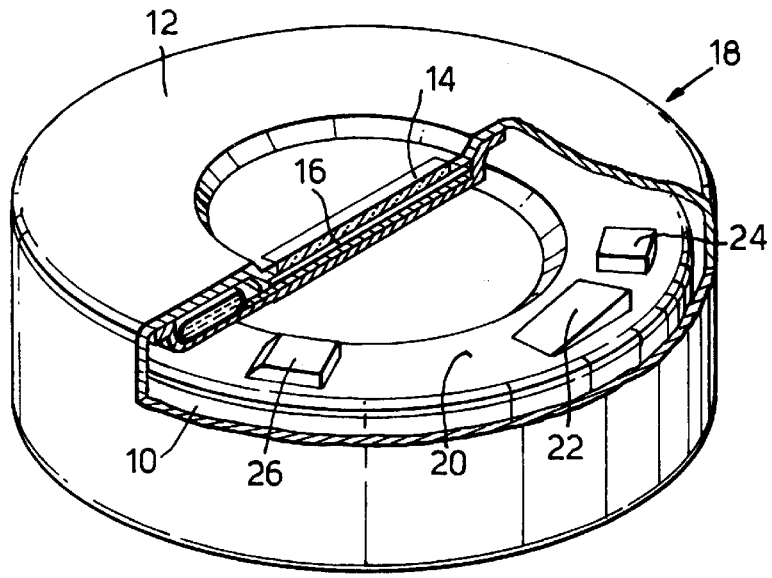
FIG. 2 is a perspective view of the same embodiment of the cap, part of the outer cap being cut away to show internal details.

In the following figures similar numbers are used to designate similar parts.

There is seen in FIGS. 1a and 1b an exemplary lifetime cap 18 according to the present invention. A typical screw or lug inner cap 10 is engaged with a bottle 11 and with an outer cap 12 which fits tightly over inner cap 10. The outer cap 12 may be completely transparent; however in the shown embodiment only a window 14 is transparent. Window 14 allows viewing of an indicator 16, the color of which gives a product lifetime indication. Various embodiments of indicator 16 will be described with reference to the following figures.

The assembled cap 18 operates as follows: On the first anti-clockwise twisting of cap 18, the outer cap 12 revolves relative to the inner cap 10 by a fraction of a turn, at which point onwards the inner cap 10 and outer cap 12 become locked together and from then on turn as an integral unit.

Referring now to FIG. 2, the cap 18 is seen in further detail. The upper face 20 of inner cap 10, seen through the cut-out, has a projecting wedge 22 and an adjacent stop block 24. The outer cap 12 has a downwardly projecting rider (not seen due to the cut-away) which when the outer cap 12 is turned anti-clockwise rides over the wedge 22 and settles in the space between the wedge 22 and stop block 24, thus locking together the two parts 10, 12 of the cap 18. The function of the additional projection 26 will be explained with reference to FIG. 3b.

Figure 3A:
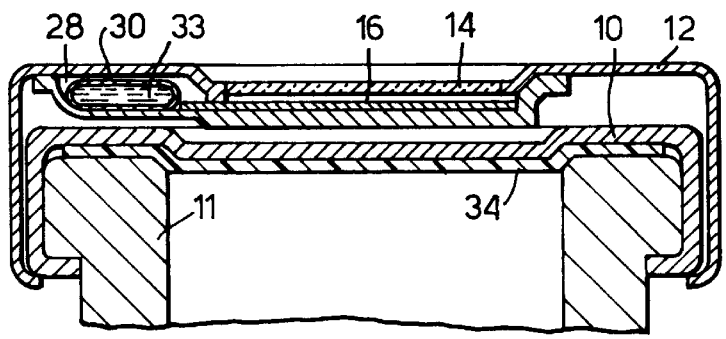
FIG. 3a is an enlarged detail cross-sectioned elevation showing details of the indicator before container opening.
Figure 3B:
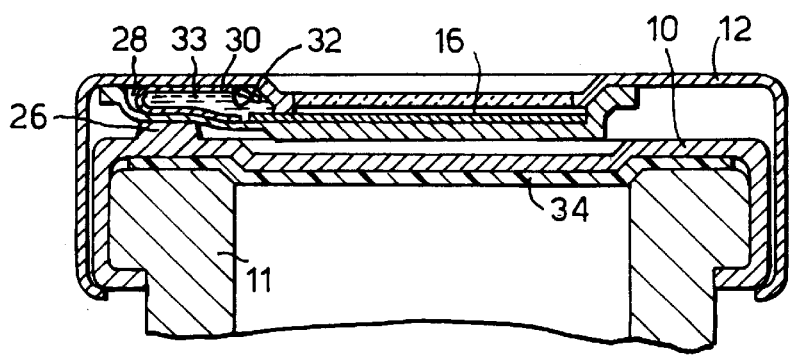
FIG. 3b is the same as 3a, but after opening of the container.

FIGS. 3a and 3b illustrate how the indicator 16 is actuated during first opening of the cap 18 described in the previous figures. The outer cap 12 includes a recess 28 in which is located a fluid capsule 30 which is part of the indicator 16. As the outer cap 12 is revolved relative to the inner cap 10, the projection 26 contacts the indicator 16 and squeezes capsule 30 against a face 32 of the outer cap 12, thereby rupturing the capsule 30 and releasing its fluid 33, and initiating action of the lifetime measurement mechanism.

The item shown underneath the inner cap 10 is a resilient seal washer 34.

Figure 4A:
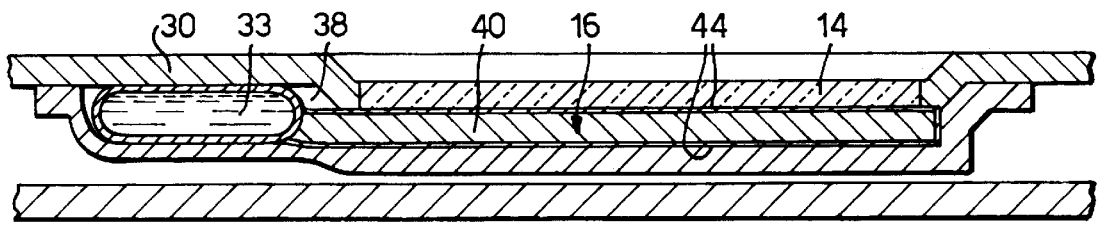
FIG. 4a is a further enlarged view of an indicator contained in a laminated package.
Figure 4B:
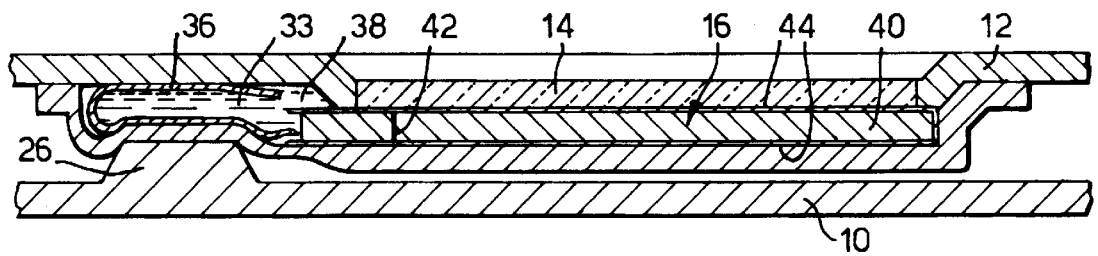
FIG. 4b is the same as 4a, but after opening.

Seen in FIGS. 4a and 4b is an enlarged detail showing the operation of a preferred embodiment of the indicator 16. The ruptured capsule 36 releases the fluid 33 which it contained into the recess 38, which now functions as a reservoir for a porous strip 40. Migration of the fluid 33 along the strip 40 causes a front 42 to proceed along the strip 40. Such progression is visible as a color change, and the degree of advance shows the progress of time since the rupturing of the capsule 30 and thus the elapsed time since cap was first opened.

In the preferred embodiment shown the porous strip 40 is mounted inside a laminated transparent package 44 so that the path of liquid migration is restricted to that of the porous strip 40.

A number of liquid migration and color changing systems may be employed for achieving a color-changing front which proceeds slowly along the porous strip 40.

Using a porous medium such as paper or another cellulose-based medium, migration speed will be relatively fast, of the order of hours to days to traverse a 2 cm long strip, such migration being mainly due to capillary action. For slower migration a micro-porous material can be used to achieve migration taking weeks or months to traverse a 2 cm strip. The mechanism of such migration is primarily that of diffusion. In a preferred embodiment of a liquid migration mechanism through a micro-porous medium, such medium is a sol-gel doped with a reagent, and the color-changing reaction system is a chelation reaction.

The liquid used is a zinc solution which diffuses slowly through the sol-gel strip, reacting with the dopant as it proceeds. A suitable chelating agent is 4-(2-pyridylazo) resorcinol monosodium salt, hereinafter PAR, which effects a color change from yellow to red. As the diffusion front proceeds along the doped sol-gel strip, the sharp color change which results can be clearly seen from above via a transparent section mounted above the strip.

A preferred embodiment involves a suitable support material for the doped sol-gel such as standard laser printer quality paper (80 g/m2) which is cut into 1 cm by 2.5 cm strips and dip-coated with the PAR-doped sol-gel thus creating a composite-type micro-porous matrix.

Preparation of the Doped Sol-gel Fluid is Performed as Follows:

A 5 ml solution of tetraethyloxysilane is added to a stirred solution consisting of 10 ml ethanol, 1.6 ml triply distilled water, 4 drops of concentrated (33%) hydrochloric acid (HCl) and 0.1 g of PAR. After stirring for a further 5 minutes, 0.3 g of hexadecyltrimethylammonium bromide is added and stirred until the solution becomes homogeneous. The solution is stirred for a further 2 hours.

The Dipping of the Paper into this Sol-gel Fluid is Performed as Follows:

The paper strip is held by a dipping machine at one end. It is lowered into the non-stirred solution and then is withdrawn at a rate of 0.08 cm/sec. Drying and curing is effected by inserting the paper into an oven at 50° C. for 24 hours. Lamination is performed at 150° C. with 250 micron laminate.

As is obvious to one skilled in the art, a number of alternative liquid-migration media, a number of alternative reaction mechanisms, a number of methods of impregnating or doping a support media, and a number of ways of laminating are feasible.

A number of micro-porous media enable a slow diffusion effect to be implemented. Examples include Empore™ particle-filled Teflon (available from Minnesota Mining and Manufacturing Company, St. Paul, Minn., USA), silica gel, or a micro-porous polymeric material such as Teslin™ (available from PPG Industries Inc., Pittsburgh, Pa., USA)

Some alternative systems capable of producing a similar color change to that of the above described preferred embodiment are listed below:

To implement other chelation reactions, alternative chelating agents such as 1,10 phenanthroline, zincon, or 2,2'-biquioline (cupron) can be incorporated or doped into the porous medium. Alternative liquid reagents that would migrate into the porous medium includes solutions of further ions such as of copper, iron and of calcium.

To implement acid/base reaction systems, suitable pH indicators including bromothymol blue, methyl red, cresol red can be incorporated or doped into the porous medium. Suitable acid or base liquid reagents which would migrate into the porous medium include hydrochloric acid, citric acid and ascorbic acid, and bases include solutions of sodium hydroxide and sodium hydrogen phosphate.

To implement redox reactions, redox indicators such as n-phenylanthrancilic acid or a bleachable dye can be incorporated or doped into the porous medium. Alternative liquid reagents that would migrate into the porous medium include solutions of bleaching powder or of vanadium salts.

To implement a non-reactive system, a porous medium with no embedded reagents can be slowly penetrated by a dye.

To implement a temperature sensitive system, an enzyme such as lipase can be incorporated or doped into the porous medium together with an appropriate indicator such as bromothymol blue and a substrate such as tricaproin allowed to migrate through the porous medium.

An alternative preferred embodiment based upon the same physical design as that shown in FIGS. 3a and 3b and FIGS. 4a and 4b uses a non-reactive system to implement the lifetime indicator, where the migration mechanism used is the slow diffusion of a dye through a commercially-available micro-porous medium. In a preferred embodiment, the diffusion medium is the highly-filled micro-porous polyolefin Teslin, and the dye is a red food coloring (such as is available from McCormick & Co. Inc., Hunt Valley, Md., USA). On activation the dye proceeds to diffuse slowly through the Teslin strip, changing its color from white to red. As the diffusion front proceeds along the Teslin strip, the sharp color change which results is clearly seen via an at least partially transparent window mounted above the strip.

In a modification of this system, a non-transparent porous medium becomes transparent upon penetration by a liquid, thereby revealing color background placed behind the porous medium.

In the above example the advance of a migration front is viewable from above as an advance of a color change line. As diffusion rates are relatively insensitive to temperature, this embodiment is advantageous where only elapsed time since opening should be indicated.

In a further embodiment of the present invention greater temperature sensitivity to the rate of diffusion is achieved by means of a micro-porous medium whose pore size is a function of temperature. In such an embodiment, a rise in temperature results in an increase in the average pore size of the micro-porous medium thereby allowing the migrating species greater mobility through the said micro-porous medium.

Other means of achieving greater temperature sensitivity can include increasing the viscosity of the diffusing fluid, as described, e.g., in U.S. Pat. No. 5,667,303, the relevant teachings of which are incorporated herein by reference.

To increase temperature sensitivity an alternative embodiment involves reactions whose rates are very temperature dependent such as enzymatic/substrate reactions. In such cases the embodiment involves the migration of one reagent with another at a rate substantially faster than diffusion such as the mixing of two liquids to produce a homogenized mixture that then proceeds to react at a rate highly dependent upon temperature. The resulting color changes are then viewed through a window from above.

Figure 5:
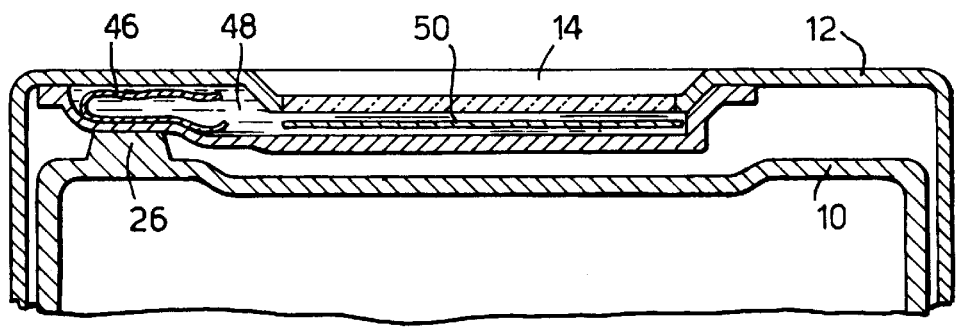
FIG. 5 is a an enlarged detail cross-sectioned elevation showing details of a time-temperature indicator after container opening.

Referring now to FIG. 5 there is shown a time-temperature indicator implementation of the cap of the present invention. When the liquid reagent capsule 46 is ruptured, the contained first liquid reagent 48 comes into contact with a second reagent 50. The second reagent 50 can be either a liquid or a solid or embedded on a solid. Contact between the two reagents 48, 50 produces a color change. In a preferred embodiment for the time-temperature integration implementation of the lifetime indicator, the first liquid reagent 48 is an aqueous solution of an enzyme together with a pH indicator, and the second reagent 50 contains a substrate. When the cap is opened, the time-temperature indicator is activated by rupture of the capsule 46 causing contact between the two reagents.

In a preferred embodiment the enzyme is a lipase, the substrate is tricaproin, and the indicator is a pH indicator such as bromothymol blue. The enzymatic reaction product is caproic acid. This acid is produced gradually over time as a function of both the elapsed time and the temperature, and the pH indicator shows a color shift as the amount of said acid increases. The color shift is visible through the at least partially transparent section 14 mounted over the strip area.

It will thus be seen that according to the present invention a simple and inexpensive means of providing a cap that shows a product lifetime indication based on the elapsed time or time-temperature integral since first opening of the container.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A cap for a hermetically sealed container, said cap providing a visually observable indication of elapsed time from the opening of the seal of said container, said cap including means for releasing a chemical which effects a color change which traverses a chamber formed therein, said chamber being provided with a transparent section for viewing the contents thereof and said released chemical effecting a cumulative, progressive, graphic color change of said section with time, wherein said chamber contains a porous strip for controlled migration of said chemical whereby said color change progresses over time to show elapsed time from the opening of the seal, the arrangement being such that manipulation of said cap to open said container and said seal effects activation of said releasing means, said cap comprising at least two parts movable relative to each other and having said chamber formed therebetween, at least one of said parts being provided with said transparent section for viewing said chamber and wherein one of said parts includes a recess having a fluid-containing capsule and said other part is provided with a protrusion which is brought into alignment with said recess on opening of said container and is adapted to rupture said fluid-containing capsule.

2. A cap according to claim 1, wherein said porous strip is formed of micro-porous material.

3. A cap according to claim 1, wherein said chamber is provided with a strip containing a color-changing indicator in a porous medium and a liquid reagent which slowly diffuses along said medium to cause a color change, said reagent being released as a result of the movement of said two parts of said cap relative to each other.

4. A cap according to claim 1, wherein said chamber is provided with a strip containing a reagent in a porous medium, and said capsule contains a color-changing indicator which slowly diffuses along said medium to cause a color change, said indicator being released as a result of the movement of said two parts of said cap relative to each other.

5. A cap according to claim 1, wherein said chemical effects a reaction involving a color change in combination with a reagent held in said chamber.

6. A cap according to claim 5, wherein said reaction is based on the interaction between a chelating agent and a metal ion solution.

7. A cap according to claim 5, wherein said reaction is based on the interaction between a pH indicator and a base.

8. A cap according to claim 5, wherein said reaction is based on the interaction between a pH indicator and an acid.

9. A cap according to claim 5, wherein said reaction is based on the interaction between a redox indicator and a reducing agent.

10. A cap according to claim 5, wherein said reaction is based on the interaction between a redox indicator and an oxidizing agent.

11. A cap according to claim 5, wherein said reaction is based on the interaction between an enzyme and a substrate.

12. A cap according to claim 5, wherein said reaction is temperature dependent.

13. A cap according to claim 1, wherein said chemical is a dye.

14. A cap according to claim 13, wherein the rate of traversion is temperature dependent.

15. A cap according to claim 13, wherein said dye slowly migrates through a porous medium, wherein said medium is at least partially visible through a transparent section in the cap, resulting in a color-change front which progresses along said medium thereby graphically showing the passage of time.

16. A cap according to claim 1 in combination with a hermetically-sealed container containing a perishable material.

17. A cap for a hermetically sealed container according to claim 1, said cap providing a visually observable indication of elapsed time from the opening of the seal of said container, said cap including means for releasing a chemical which effects a temperature dependent color change in a chamber formed therein, said chamber being provided with a transparent section for viewing the contents thereof and said released chemical effecting a color change of said section with time and temperature, the arrangement being such that manipulation of said cap to open said container and said seal effects activation of said releasing means.

* * * * *